United States Patent Office.

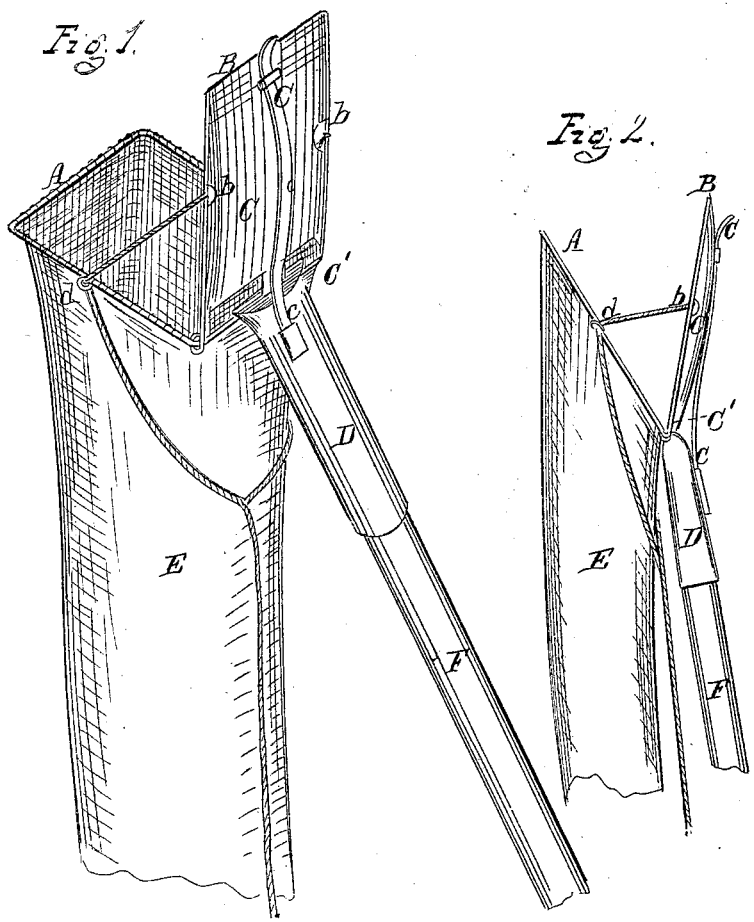

EDEMON WARD, OF URBANA, OHIO.

Letters Patent No. 94,457, dated August 31, 1869.

IMPROVEMENT IN FRUIT-PICKER.

The Schedule referred to in these Letters Patent and making part of the same

*To whom it may concern:*

Be it known that I, EDEMON WARD, of Urbana, in the county of Champaign, and State of Ohio, have invented a new and useful Machine or Apparatus for Picking and Gathering Fruit from the tree without bruising the same; and I do hereby declare that the following is a full and exact description thereof, reference being had to the accompanying drawings, and to the letters of reference marked thereon. making a part of this specification, of which—

Figure 1 is a perspective view, and

Figure 2 is a side view.

To enable others skilled in the art to make and use my invention, I will proceed to describe its construction and operation.

I construct two wire frames of the desired dimensions, as shown at A and B, and hinge them together at the heel, by turning the ends of the wire of one over the other, or in any other manner.

The back or outside of frame B, I cover with a tin plate, concave on the inside, with nicks or small openings on the sides, near the upper corners, as shown at $b\ b$.

The lower end of this plate C, I provide with a projection or stop, C', which, when the hinged portion B has been raised to a certain point, by the action of the spring $c$, abuts against the face of the socket D, and prevents the frame B from swinging back further.

This is an important feature, as without such stop, the frame B would be turned back, if brought in contact with a limb of a tree, so far as to break the spring.

To the frame A, I attach a socket, D, by soldering or otherwise, for the reception of a wooden handle.

To the socket D, I attach a steel spring, and connect it with the back or convex side of the tin plate C, as shown at $c\ c$, fig. 2, for throwing back or opening frame B, for the reception of the fruit.

To the outside of frame A, I attach a narrow sack or bag, as shown at E, fig. 2, of sufficient length to reach the hand of the operator.

In the socket D, I insert a wooden handle, F, of any desired length, to reach the fruit.

To the frame B, at the nicks $b\ b$, I attach a cord, and pass it through the eyelets $a\ a$ on frame A, and extend it down the handle, through rings or staples, to the operator.

In using my invention, I place the apple or other fruit within and between the frames A and B, and by pulling the cord, the tin plate of frame B presses the stem of the fruit against the top of frame A, which breaks it off, and the fruit falls into the sack E, and descends through the same to the hand of the operator without bruising.

What I claim as my invention, and desire to have secured by Letters Patent, is—

In a fruit-picker, constructed substantially as shown and described, the combination of the frames A B, spring $c$, stop C', and socket D, all arranged to operate as set forth.

EDEMON WARD.

Witnesses:
CYRUS SNYDER,
JAMES C. WELLER.